(12) United States Patent
Morita

(10) Patent No.: US 9,874,224 B2
(45) Date of Patent: Jan. 23, 2018

(54) CENTRIFUGAL COMPRESSOR AND TURBOCHARGER

(71) Applicant: IHI Corporation, Koto-ku (JP)

(72) Inventor: Isao Morita, Tokyo (JP)

(73) Assignee: IHI Corporation, Koto-ku (JP)

( * ) Notice: Subject to any disclaimer, the term of this patent is extended or adjusted under 35 U.S.C. 154(b) by 97 days.

(21) Appl. No.: 14/955,688

(22) Filed: Dec. 1, 2015

(65) Prior Publication Data

US 2016/0084263 A1 Mar. 24, 2016

Related U.S. Application Data

(63) Continuation of application No. PCT/JP2014/079305, filed on Nov. 5, 2014.

(30) Foreign Application Priority Data

Nov. 22, 2013 (JP) .................................. 2013-241868

(51) Int. Cl.
*F04D 29/44* (2006.01)
*F04D 17/10* (2006.01)
(Continued)

(52) U.S. Cl.
CPC ............ *F04D 29/441* (2013.01); *F02B 33/40* (2013.01); *F02B 37/00* (2013.01); *F02B 39/00* (2013.01); *F04D 17/10* (2013.01); *F04D 25/04* (2013.01); *F04D 29/284* (2013.01); *F04D 29/422* (2013.01); *Y02T 10/144* (2013.01)

(58) Field of Classification Search
CPC .......... F02B 33/40; F02B 37/00; F02B 39/00; F04D 17/10; F04D 25/04; F04D 29/2255; F04D 29/284; F04D 29/422; F04D 29/44; F04D 29/441; Y02T 10/144

See application file for complete search history.

(56) References Cited

U.S. PATENT DOCUMENTS 2,471,174 A 5/1949 Trumpler et al.
4,460,310 A 7/1984 Plunkett
(Continued)

FOREIGN PATENT DOCUMENTS

CN 103261622 A 8/2013
JP 59-015695 1/1984
(Continued)

OTHER PUBLICATIONS

International Search Report dated Feb. 3, 2015 in PCT/JP2014/079305 filed Nov. 5, 2014 (with English translation).

(Continued)

*Primary Examiner* — Audrey K Bradley
(74) *Attorney, Agent, or Firm* — Oblon, McClelland, Maier & Neustadt, L.L.P.

(57) ABSTRACT

A diffuser includes a ring-shaped parallel part, and a ring-shaped throttling part formed continuously to the inside of the parallel part in a radial direction. A wall surface of the throttling part includes a flow passage area minimum portion which makes minimal a flow passage area of the diffuser, and a ring-shaped protruding portion located closer to the outlet side of the compressor wheel than the flow passage area minimum portion, and protruding toward the flow passage of the diffuser.

5 Claims, 7 Drawing Sheets

(51) Int. Cl.
*F04D 29/28* (2006.01)
*F04D 29/42* (2006.01)
*F02B 33/40* (2006.01)
*F02B 39/00* (2006.01)
*F04D 25/04* (2006.01)
*F02B 37/00* (2006.01)

(56) References Cited

U.S. PATENT DOCUMENTS

| | | | |
|---|---|---|---|
| 5,228,832 A * | 7/1993 | Nishida | F04D 17/06 415/208.1 |
| 5,316,441 A * | 5/1994 | Osborne | F04D 29/444 415/208.3 |
| 2006/0275113 A1 * | 12/2006 | Chen | F04D 29/4206 415/206 |
| 2009/0060731 A1 | 3/2009 | Chen et al. | |
| 2010/0129209 A1 | 5/2010 | Sugimoto et al. | |

FOREIGN PATENT DOCUMENTS

| | | |
|---|---|---|
| JP | 06-004398 U | 1/1994 |
| JP | 06-063897 U | 9/1994 |
| JP | 08-121378 A | 5/1996 |
| JP | 10-176699 A | 6/1998 |
| JP | 2003-120594 | 4/2003 |
| JP | 2005-240680 A | 9/2005 |
| JP | 2007-309169 | 11/2007 |
| JP | 2008-75536 | 4/2008 |
| JP | 2008-510100 | 4/2008 |
| JP | 2008138626 A * | 6/2008 |
| JP | 2008-175124 | 7/2008 |
| JP | 2012-002140 A | 1/2012 |
| JP | 5050511 | 10/2012 |
| JP | 2013-199941 | 10/2013 |

OTHER PUBLICATIONS

Written Opinion dated Feb. 3, 2015 in PCT/JP2014/079305 filed Nov. 5, 2014.

Combined Office Action and Search Report dated Oct. 9, 2016 in Chinese Patent Application No. 201480031782.3 (with English translation of Categories of Cited Documents).

* cited by examiner

CENTRIFUGAL COMPRESSOR AND TURBOCHARGER

CROSS REFERENCE TO RELATED APPLICATIONS

This application is a continuation application of International Application No. PCT/JP2014/079305, filed on Nov. 5, 2014, which claims priority to Japanese Patent Application No. 2013-241868, filed on Nov. 22, 2013, the entire contents of which are incorporated by reference herein.

BACKGROUND

1. Technical Field

The present disclosure relates to a centrifugal compressor of the like that compresses fluid such as air using centrifugal force.

2. Description of the Related Art

In recent years, various types of research and development have been made on centrifugal compressors used in turbochargers, gas turbines, industrial pneumatic devices and the like.

A general centrifugal compressor includes a compressor housing. The compressor housing has a shroud inside. A compressor wheel is rotatably provided around the center axis thereof in the compressor housing. The compressor wheel includes a hub (compressor disk). The hub has a hub surface extending outward in the radial direction (in the radial direction of the compressor wheel) from one axial side (one axial side of the compressor wheel). Furthermore, the hub surface has plural compressor blades integrally provided thereon at intervals in the circumferential direction. Each of the compressor blades has a distal end edge extending along the shroud of the compressor housing.

A fluid inlet port (fluid inlet flow passage) for taking in fluid such as air into the compressor housing is formed on the inlet side (upstream side) of the compressor wheel in the compressor housing. Furthermore, a ring-shaped diffuser (diffuser flow passage) that decelerates compressed fluid (compressed fluid such as compressed air) to increase its pressures is formed on the outlet side (downstream side) of the compressor wheel in the compressor housing. In addition, the diffuser having a high static-pressure recovery property usually has a ring-shaped parallel part, and a ring-shaped throttling part formed continuously to the inside of the parallel part in the radial direction. In the parallel part, a wall surface located on the shroud side and a wall surface located on the hub side are provided so as to be in parallel to the radial direction. On the other hand, in the throttling part, a wall surface located on the shroud side gradually approaches a wall surface located on the hub side toward the outside in the radial direction.

A compressor scroll (compressor scrolling flow passage) having a spiral shape is formed on the outlet side of the diffuser within the compressor housing to communicate with the diffuser. Furthermore, a fluid discharge port (fluid discharge flow passage) for discharging the compressed fluid to the outside of the compressor housing is formed at an appropriate position within the compressor housing to communicate with the compressor scroll.

In addition, conventional arts related to the present disclosure are described in Japanese Patent Laid-Open Publication Nos. 2013-199941 and 2007-309169, and Japanese Patent No. 5050511.

SUMMARY

Meanwhile, in recent years, there are increasing demands for centrifugal compressors having an operational range further extended to the low flow rate side by suppressing surging of the centrifugal compressor without deteriorating compressor performances on the high flow rate side in the operational range of the centrifugal compressor.

In view of the circumstances described above, an object of the present disclosure is to provide a centrifugal compressor and the like that can respond to the demand described above.

A first aspect of the present disclosure is a centrifugal compressor, including: a housing including a shroud inside thereof; an wheel rotatably provided in the housing; an inlet port for fluid communicating with an inlet side of the wheel; a diffuser communicating with an outlet side of the wheel; a discharge port for the fluid; and a scroll having a spiral shape, allowing the fluid flowing out from the wheel through the diffuser to circulate to the discharge port, wherein the diffuser includes: a first wall extending toward an outside in a radial direction; and a second wall having a tapered surface extending from the shroud toward the outside in the radial direction to gradually approach the first wall, and a parallel surface extending from the tapered surface toward the outside in the radial direction and extending in parallel to the first wall, and wherein the tapered surface of the second wall includes: a flow passage area minimum portion that makes minimal a flow passage area of the diffuser together with the first wall; and a protruding portion formed integrally with the tapered surface, located closer to the outlet side of the wheel than the flow passage area minimum portion, and including a curved surface protruding toward a flow passage of the diffuser.

It should be noted that, in this DESCRIPTION and CLAIMS of the present application, the wording "fluid" includes gas such as air. The wording "provided" not only means "directly provided" but also means "indirectly provided by way of other members." The wording "integrally provided" includes meaning "integrally formed." The "axial direction" represents the axial direction of the compressor wheel, and the "radial direction" represents the radial direction of the compressor wheel. The wording "shroud-side wall surface" represents a wall surface located on the side of a surface formed by extending the shroud of the compressor housing outward in the radial direction, and the wording "hub-side wall surface" represents a wall surface located on the side of a surface formed by extending the hub surface of the compressor disk outward in the radial direction. The "meridian plane" represents a plane including the center axis of the compressor wheel. The "upstream" represents upstream when viewed in the flowing direction of a main flow of the fluid, and the "downstream" represents downstream when viewed in the flowing direction of the main flow of the fluid.

A second aspect of the present disclosure is a turbocharger that uses pressure energy of exhaust gas from an engine to supercharge air supplied to a side of the engine, and includes a centrifugal compressor according to the first aspect.

According to the present disclosure, it is possible to suppress expansion of a backflow area generated on the upstream side of the compressor wheel on a low flow rate side in an operational range of the centrifugal compressor while securing sufficient choking flow rate of the centrifugal compressor. Thus, it is possible to further extend the operational range of the centrifugal compressor to the low flow rate side by suppressing surging of the centrifugal compressor without deteriorating compressor performances on the high flow rate side in the operational range of the centrifugal compressor.

DESCRIPTION OF THE EMBODIMENTS

The present disclosure is based on the following newly obtained findings.

Figure 5A:
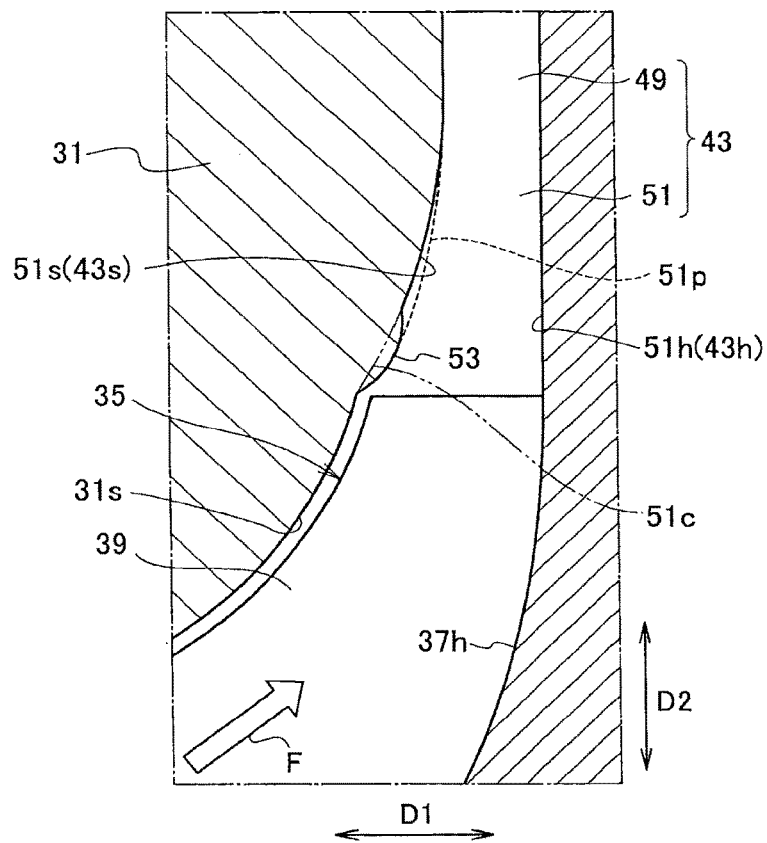
FIG. 5A is a meridian view illustrating structures of diffusers in an embodiment of the present disclosure, in a conventional example, and in a comparative example.
Figure 5B:
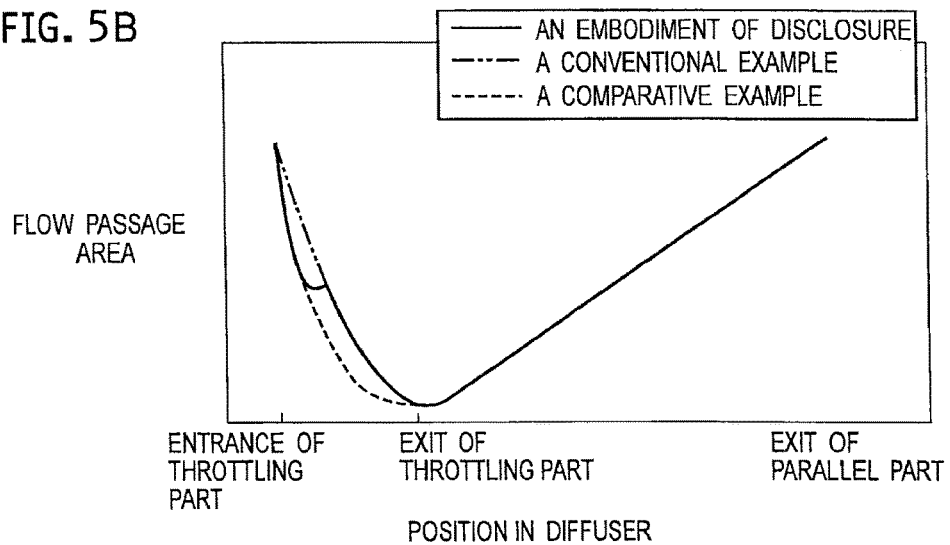
FIG. 5B is a diagram illustrating relationships between radial positions in the diffuser and the flow passage area in an embodiment of the present disclosure, in a conventional example, and in a comparative example.

FIG. 5A is a meridian view illustrating a diffuser 43 and its surroundings in an embodiment of the present disclosure, in a conventional example, and in a comparative example, and indicating flow passages assumed in computational fluid dynamics (CFD) analysis. FIG. 5B is a diagram illustrating relationships between radial positions of a diffuser and the flow passage area in the example of the present disclosure, in the conventional example, and in the comparative example. In the drawing, "D1" indicates the axial direction, and "D2" indicates the, radial direction. Note that, in the drawing, "F" indicates the flowing direction of a main flow of fluid.

As indicated by the solid line in FIG. 5A, in the example of the present disclosure, the diffuser 43 includes a throttling part 51 having a shroud-side wall surface 51s (43s) on which a protruding portion 53 is protrudingly formed. The surface of the protruding portion 53 has a curved shape. Furthermore, the end edge of the protruding portion 53 on the outside in the radial direction on the meridian plane forms a discontinuous point at which tangential directions discontinuously change.

On the other hand, as indicated by the two-dot chain line in FIG. 5A, in the conventional example, the throttling part 51 of the diffuser 43 includes a shroud-side wall surface 51c on which the protruding portion 53 is not formed. Furthermore, as indicated by the broken line in FIG. 5A, in the comparative example, the throttling part 51 of the diffuser 43 does not have the protruding portion 53, and includes a shroud-side wall surface 51p formed in a manner such that the flow passage width of the throttling part 51 is narrower than that of the conventional example by the amount of protrusion of the protruding portion 53 according to the example of the present disclosure. Note that, as for shapes other than that of the shroud-side wall surface, the example of the present disclosure, the conventional example, and the comparative example have the same shape. In addition, as illustrated in FIG. 5B, in all of the examples described above, the flow passage area of the diffuser 43 is minimal at the exit of the throttling part 51 or before the exit of the throttling part.

Figure 6:
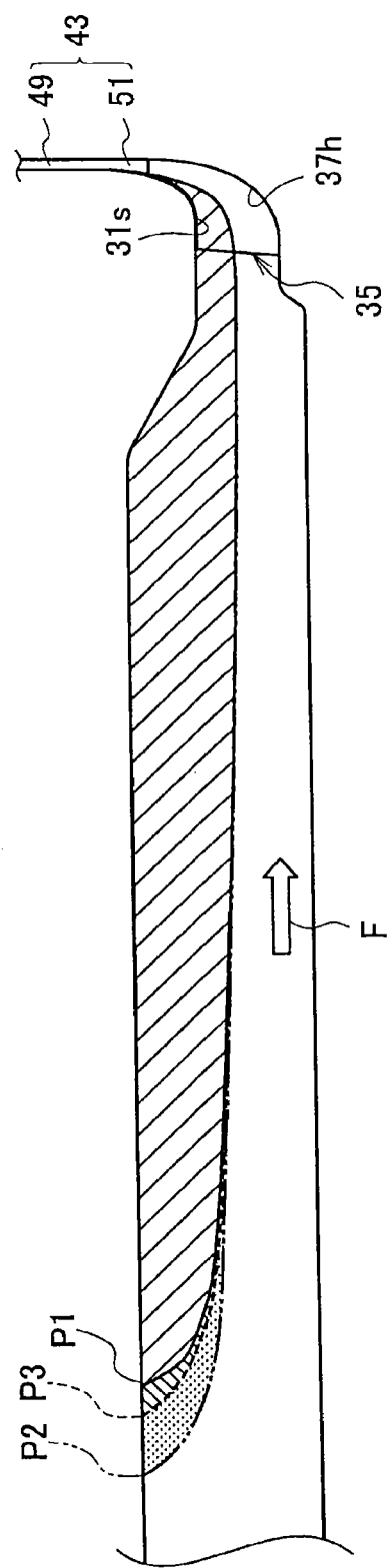
FIG. 6 is a diagram illustrating a backflow area generated on the upstream side of the compressor wheel on a low flow rate side in an operational range.

FIG. 6 illustrates results of computational fluid analysis made to the centrifugal compressor assumed to have the flow passages of the example of the present disclosure, the conventional example, and the comparative example illustrated in FIG. 5A. More specifically, FIG. 6 illustrates backflow areas generated on an upstream side of an compressor wheel (compressor impeller) when the compressor wheel operates on the low flow rate side in an operational range. Note that, in FIG. 6, the "P1" indicates the end of the backflow area in the example of the present disclosure, the "P2" indicates the end of the backflow area in the conventional example, and the "P3" indicates the end of the backflow area in the comparative example.

As illustrated in FIG. 6, from the analysis results, it is found that, with the centrifugal compressor of the example of the present disclosure, it is possible to suppress expansion of the backflow area generated on the upstream side of the compressor wheel (compressor wheel) 35 on the low flow rate side of the operational range, as compared with the conventional example and the comparative example. It is considered that this is because a portion of the protruding portion 53 located on the upstream side (portion of the protruding portion extending from the top portion thereof to the end edge on the outside in the radial direction) blocks (stops) part of the backflow on the side of the shroud wall surface 51s (43s) of the diffuser 43.

An embodiment according to the present disclosure will be described with reference to FIG. 1 to FIG. 4. Note that, as indicated in the drawings, "L" indicates the left direction, "R" indicates the right direction, "D1" indicates the axial direction, and "D2" indicates the radial direction.

Figure 4:
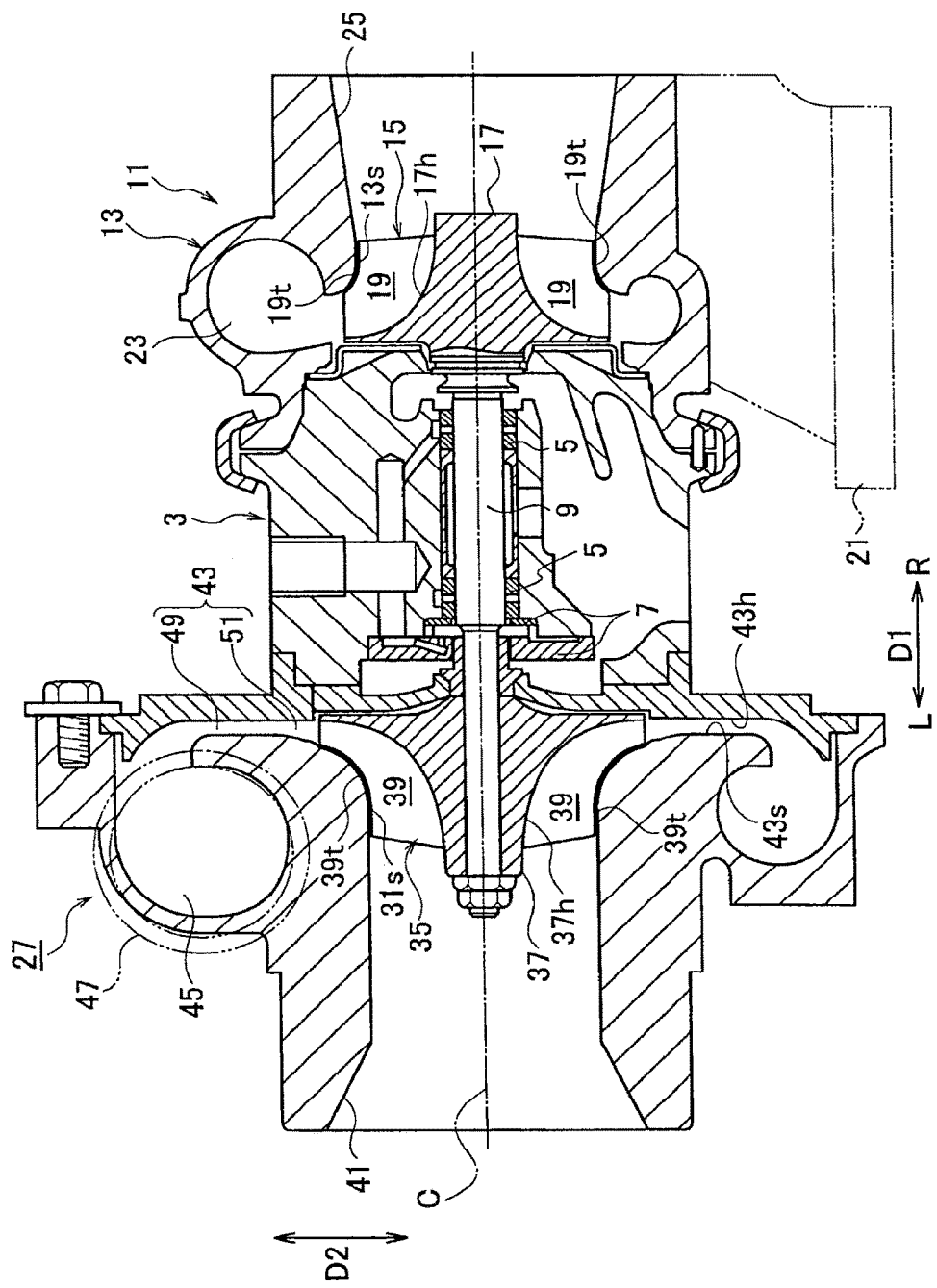
FIG. 4 is an elevation sectional view illustrating a turbocharger for vehicles according to an embodiment of the present disclosure.

As illustrated in FIG. 4, a turbocharger 1 according to the present embodiment uses pressure energy of the exhaust gas (one example of gas) from an engine (not illustrated) to supercharge (compress) air supplied to the engine. The turbocharger 1 is mounted, for example, on a vehicle.

The turbocharger 1 includes a bearing housing 3. The bearing housing 3 has a pair of radial bearings 5 and a pair of thrust bearings 7, each of which is provided in the bearing housing 3. A rotor shaft (rotating shaft) 9 extending in the right-left direction is rotatably provided to the plural bearings 5 and 7. In other words, a rotor shaft 9 is rotatably provided to the bearing housing 3 by way of the plural bearings 5 and 7.

A radial turbine 11 that generates rotational force (rotational torque) using pressure energy of the exhaust gas is disposed on the right side of the bearing housing 3.

A turbine housing 13 is provided on the right side of the bearing housing 3. The turbine housing 13 has a shroud 13s inside. Furthermore, a turbine wheel (turbine impeller) 15 is rotatably provided around the center axis (center axis of the turbine wheel 15, in other words, the center axis of the rotor shaft 9) C thereof in the turbine housing 13. The turbine wheel 15 is connected integrally with the right end portion of the rotor shaft 9 in a concentric manner. The turbine wheel 15 includes a turbine disk 17. The turbine disk 17 has a hub surface 17h extending outward in the radial direction (outward in the radial direction of the turbine wheel 15) from the right side. Furthermore, plural turbine blades 19 are formed integrally on the hub surface 17h of the turbine disk 17 at intervals in the circumference direction. The distal end edge (outer periphery) 19*t* of each of the turbine blades 19 extends along the shroud 13*s* of the turbine housing 13.

An exhaust inlet port (exhaust inlet flow passage) 21 for taking in exhaust gas into the turbine housing 13 is formed at an appropriate position in the turbine housing 13. The exhaust inlet port 21 is connected with an exhaust manifold (not illustrated) of an engine. Furthermore, a turbine scroll (turbine scrolling flow passage) 23 having a spiral shape is formed on the inlet side (upstream side when viewed in the flowing direction of a main flow of the exhaust gas) of the turbine wheel 15 within the turbine housing 13. The turbine scroll 23 communicates with the exhaust inlet port 21. An exhaust discharge port (exhaust discharge flow passage) 25 that discharges the exhaust gas is formed on the outlet side (downstream side when viewed in the flowing direction of the main flow of the exhaust gas) of the turbine wheel 15 within the turbine housing 13. The exhaust discharge port 25 is connected with an exhaust-gas cleaning device (not illustrated) through a connecting pipe (not illustrated).

Figure 3:
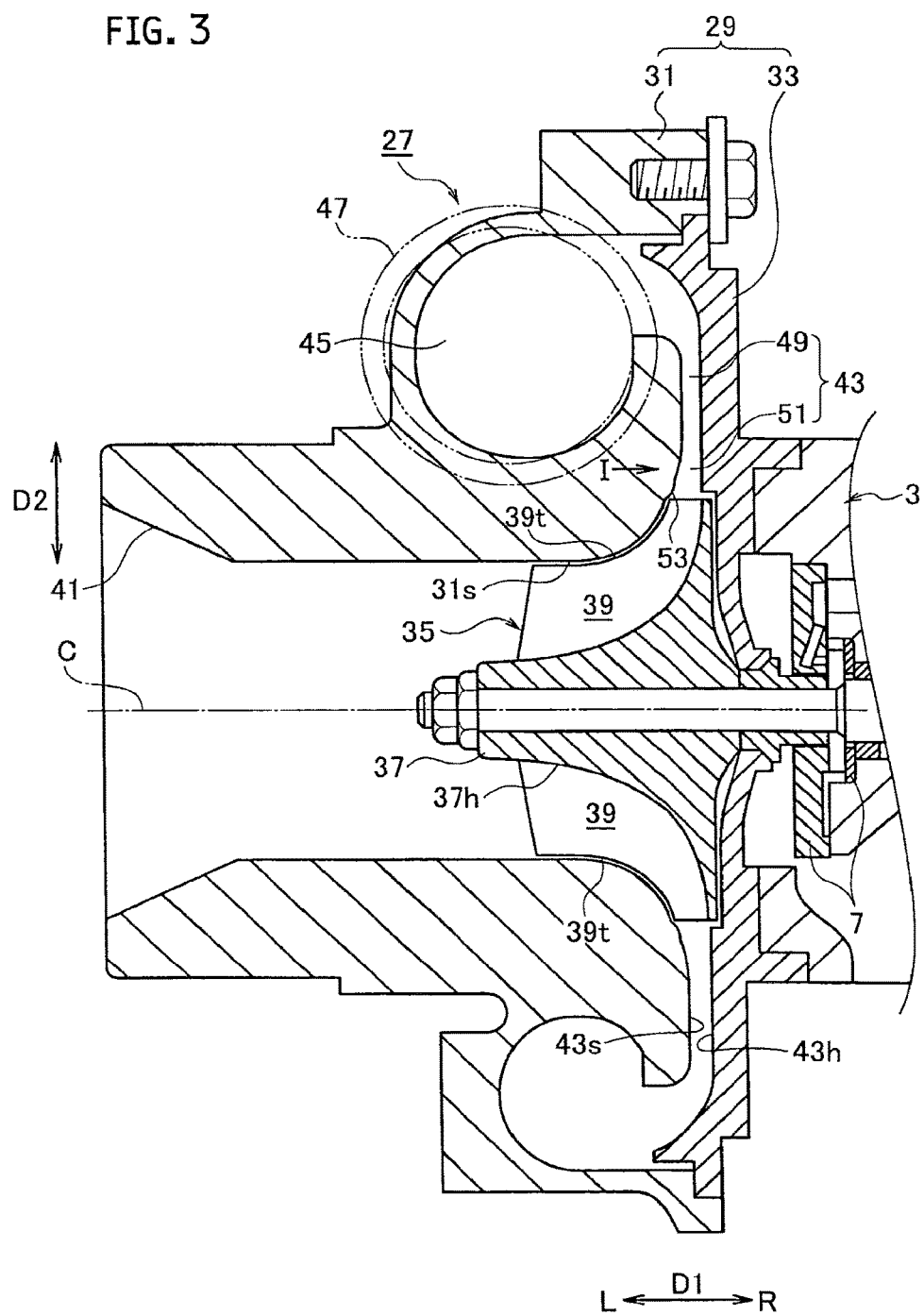
FIG. 3 is an elevation sectional view (meridian view) illustrating the centrifugal compressor according the embodiment of the present disclosure.

As illustrated in FIG. 3 and FIG. 4, a centrifugal compressor 27 that compresses air using centrifugal force is disposed on the left side of the bearing housing 3.

A compressor housing. 29 is provided on the left side of the bearing housing 3. The compressor housing 29 includes a housing body 31 having a shroud 31*s* inside, and a ring-shaped seal plate 33 disposed on the right side of the housing body 31 and connected integrally with the left side portion of the bearing housing 3. The compressor wheel 35 is rotatably provided around the center axis (center axis of the compressor wheel 35, in other words, center axis of the rotor shaft 9) C thereof in the compressor housing 29. The compressor wheel 35 is connected integrally with the left end portion of the rotor shaft 9 in a concentric manner. The compressor wheel 35 includes a hub (compressor disk) 37 connected integrally with the left end portion of the rotor shaft 9. The hub 37 has a hub surface 37*h* extending outward in the radial direction (radial direction of the compressor wheel 35) from the left side (one axial side of the rotor shaft 9 (in other words, the compressor wheel 35)). Furthermore, the hub surface 37*h* has plural compressor blades 39 integrally formed thereon at intervals in the circumferential direction. Each of the compressor blades 39 has a distal end edge (outer periphery) 39*t* extending along the shroud 31*s* of the housing body 31. Note that, in addition to the plural compressor blades 39, plural compressor blades (not illustrated) having an axial length shorter than the compressor blades 39 may be provided to the hub surface 37*h*. In this case, the compressor blades having the shorter axial length are arranged alternately with the compressor blades 39 in the circumferential direction, and are formed integrally with the hub surface 37*h*.

An air inlet port (air inlet flow passage) 41 serving as a fluid inlet port that takes in air into the compressor housing 29 is formed on the inlet side (upstream side when viewed in the flowing direction of the main flow of the air) of the compressor wheel 35 within the compressor housing 29. The air inlet port 41 is connected with an air cleaner (not illustrated) that cleans air. A ring-shaped diffuser (diffuser flow passage) 43 that increases pressures of the compressed air is formed on the outlet side (downstream side when viewed in the flowing direction of the main stream of the air) of the compressor wheel 35 within the compressor housing 29. Furthermore, a spiral compressor scroll (compressor scrolling flow passage) 45 is formed within the compressor housing 29. The compressor scroll 45 communicates with the diffuser 43. Furthermore, an air discharge port (air discharge flow passage) 47 serving as a fluid discharge port for discharging the compressed air to the outside of the compressor housing 29 is formed at an appropriate position within the compressor housing 29. The air discharge port 47 communicates with the compressor scroll 45, and is connected with an intake manifold (not illustrated) of the engine Next, the configuration of the diffuser 43 according to this embodiment will be described.

Figure 1:
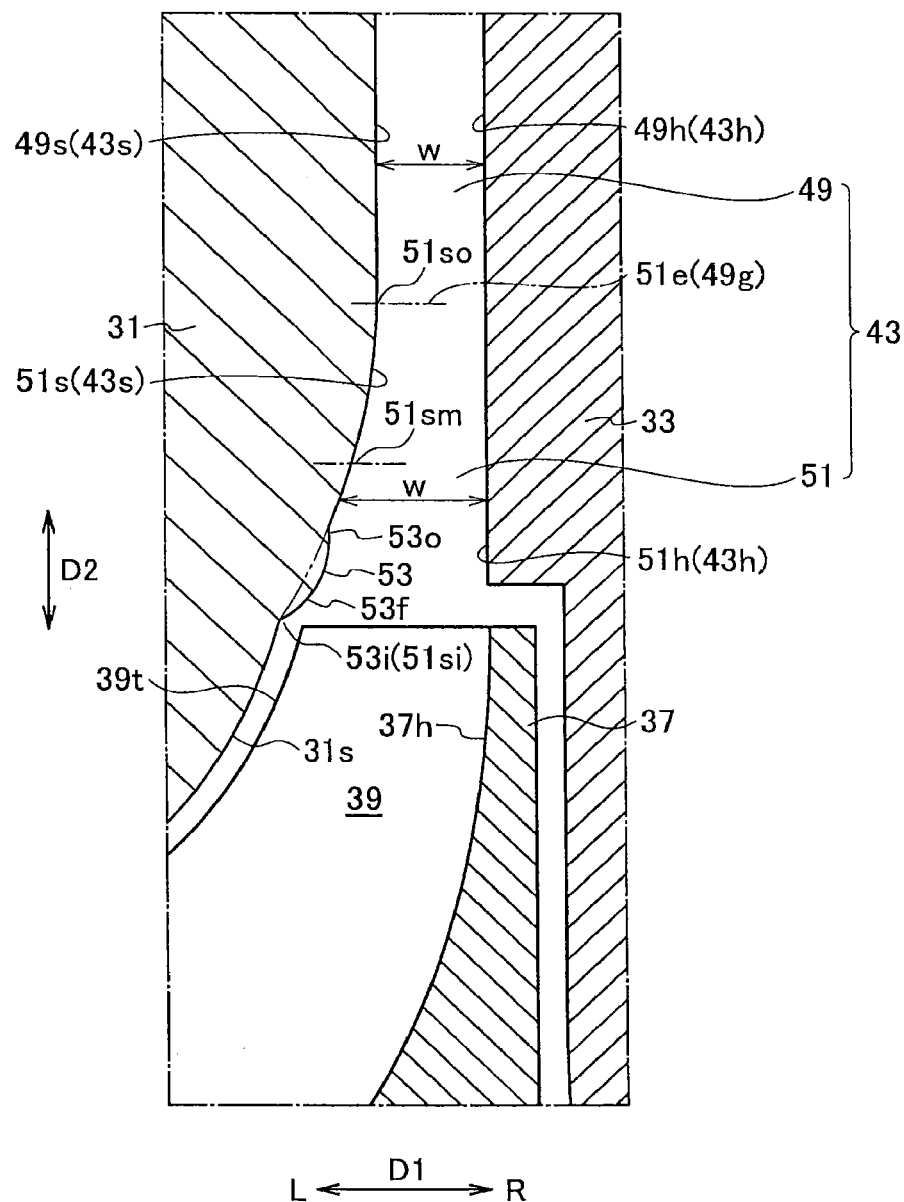
FIG. 1 is an enlarged view of the arrowed portion I in FIG. 3, illustrating a diffuser in a centrifugal compressor according to an embodiment of the present disclosure.

As illustrated in FIG. 1, the diffuser 43 includes a ring-shaped parallel part 49, and the ring-shaped throttling part 51 that is formed continuously to the inside of the parallel part 49 in the radial direction and straightens the compressed air.

The parallel part 49 includes a wall surface (hub-side wall surface) 49*h* located on the hub 37 side, and a wall surface (shroud-side wall surface) 49*s* located on the shroud 31*s* side. The wall surface 49*h* and the wall surface 49*s* are arranged in parallel to the radial direction (radial direction of the compressor wheel 35). In other words, the parallel part 49 is provided so that the flow passage width w is constant along the radial direction.

The throttling part 51 includes a wall surface (hub-side wall surface) 51*h* located on the hub 37 side, and a wall surface (shroud-side wall surface) 51*s* located on the shroud 31*s* side. The wall surface 51*h* is disposed so as to be in parallel to the radial direction. On the other hand, the wall surface 51*s* extends so as to gradually approach the wall surface 51*h* from the shroud 31*s* toward the outside in the radial direction. In other words, the throttling part 51 is formed so that the flow passage width w gradually decreases toward the outside in the radial direction. Furthermore, the wall surface 51*s* has a gently curved shape in the meridian plane.

The wall surface 49*h* of the parallel part 49 is connected with the wall surface 51*h* of the throttling part 51 at the exit 51*e* of the throttling part 51. Furthermore, the wall surface 49*h* and the wall surface 51*h* are located on the same plane. More specifically, the wall surface 49*h* and the wall surface 51*h* form the wall surface 43*h* of the diffuser 43 serving as a first wall located on the hub 37 side and extending toward the outside in the radial direction, or form part of the wall surface 43*h*.

The wall surface 49*s* of the parallel part 49 is also connected with the wall surface 51*s* of the throttling part 51 (end edge 51*so* of the throttling part 51 on the outside in the radial direction) at the exit 51*e* of the throttling part 51. Furthermore, the wall surface 51*s* is also connected with the shroud 31*s*. Thus, the wall surface 49*s* and the wall surface 51*s* form a wall surface 93*s* of the diffuser 43 serving as a second wall located on the shroud 31*s* side and forming a flow passage together with the first wall, or part of the wall surface 43*s*. More specifically, the wall surface 49*s* forms a parallel surface extending toward the outside in the radial direction and extending in parallel to the wall surface (first wall) 43*h* of the diffuser 43 from the wall surface 51*s*. On the other hand, the wall surface 51*s* forms a tapered surface that extends from the shroud 31*s* toward the outside in the radial direction to gradually approach the wall surface (first wall) 43*h* of the diffuser 43.

The diffuser 43 is configured such that the flow passage area at the exit 51*e* of the throttling part 51, in other words, at the entrance 49*g* of the parallel part 49, becomes minimal. Note that, in place of the configuration in which the flow passage area is minimal at the exit 51*e* of the throttling part 51, it may be possible to employ a configuration in which the flow passage area is minimal at a position located in front of the exit 51*e* of the throttling part 51 (located on the immediate upstream side of the exit 51*e* when viewed in the flowing direction of the main flow of the air). That is, the wall surface 51s (tapered surface of the second wall) of the throttling part 51 includes a flow passage area minimum portion which makes minimal the flow passage area of the diffuser 43 together with the wall surface (first wall) of the diffuser 43 in an area other than the area where a protruding portion 53, which will be described later, is disposed. Note that the protruding portion 53 is located closer to the outlet side of the compressor wheel 35 than the flow passage area minimum portion. For example, the exit 51e (entrance 49g of the parallel part 49) of the throttling part 51 corresponds to this flow passage area minimum portion.

The protruding portion 53 is formed on the end edge 51si side of the wall surface 51s of the throttling part 51 on the inside in the radial direction. The protruding portion 53 protrudes toward the flow passage of the diffuser 43. Furthermore, the protruding portion 53 is formed, for example, into a ring shape around the center axis of the compressor wheel 35. The surface 53f of the protruding portion 53 has a gently curved shape in the meridian plane. In this embodiment, in the meridian plane, the end edge 53o of the protruding portion 53 on the outside in the radial direction and the end edge 53i of the protruding portion 53 on the inside in the radial direction each form a discontinuous point at which tangential directions thereof discontinuously change. The end edge 53o of the protruding portion 53 on the outside in the radial direction is located on the inside in the radial direction than the central position (center position) 51sm of the wall surface 51s of the throttling part 51 in the radial direction.

The end edge 53i of the protruding portion 53 on the inside in the radial direction matches the end edge 51si of the wall surface 51s of the throttling part 51 on the inside in the radial direction. Furthermore, the average radius of curvature of the surface 53f of the protruding portion 53 in the meridian plane is set to be smaller than the average radius of curvature of the wall surface 51s of the throttling part 51 in the meridian plane. Here, in the case where a curved surface (the surface 53f of the protruding portion 53 in the meridian plane, the wall surface 51s of the throttling part 51 in the meridian plane) has one radius of curvature, the "average radius of curvature" represents this radius of curvature, and in the case where a curved surface has plural radii of curvature, the "average radius of curvature" represents the average values of the plural radii of curvature.

Figure 2A:
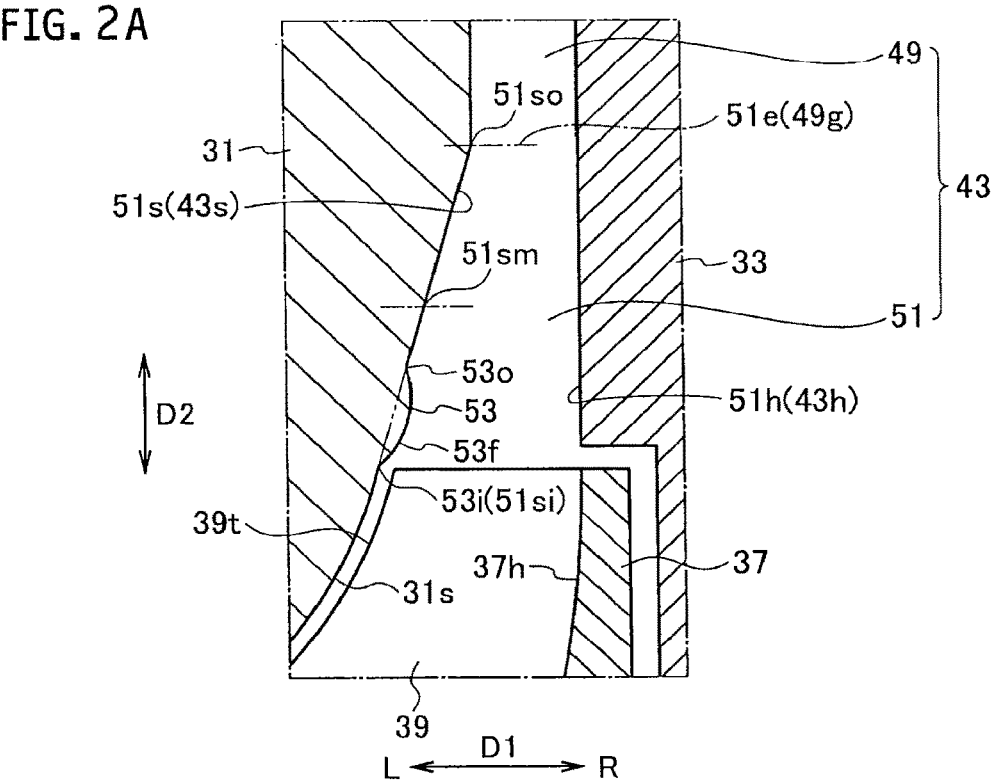
FIG. 2A and FIG. 2B are diagrams illustrating modification examples of the diffuser in the centrifugal compressor according to the embodiment of the present disclosure.
Figure 2B:
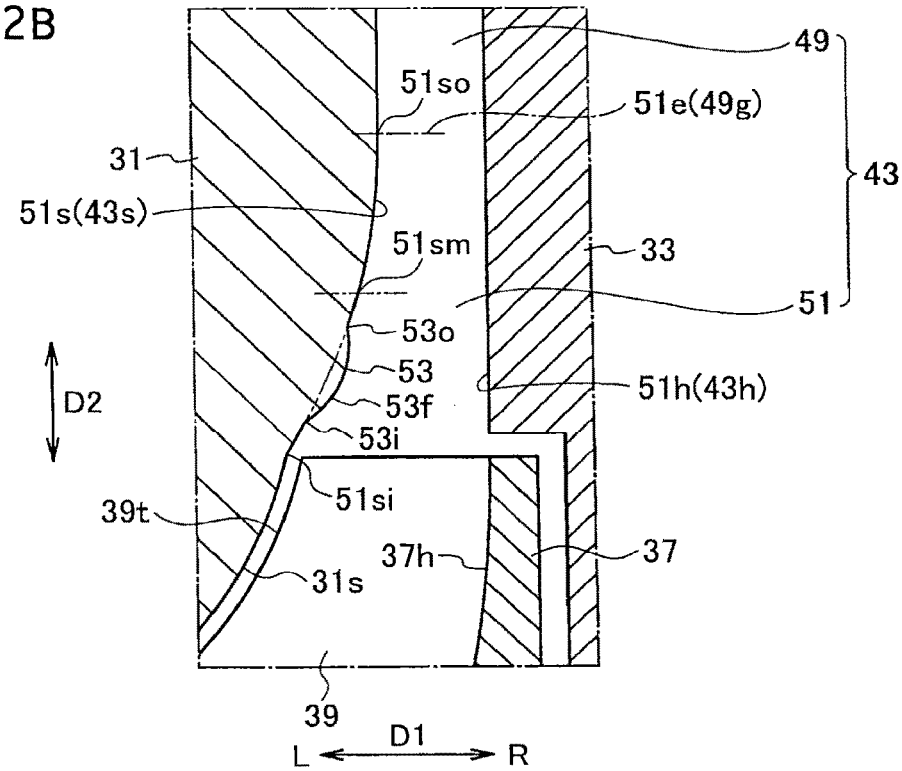

It should be noted that the wall surface (tapered surface) 51s of the throttling part 51 in the meridian plane may not be formed into a curved shape. For example, the wall surface 51s may be formed into a straight shape as illustrated in FIG. 2A. Furthermore, the end edge 53i of the protruding portion 53 on the inside in the radial direction may not match the end edge 51si of the wall surface 51s on the inside in the radial direction. For example, the end edge 53i may be located on the outside in the radial direction than the end edge 51si, which is located on the inside in the radial direction in the wall surface 51s of the throttling part 51 as illustrated in FIG. 2B.

It should be noted that the end edge 53o of the protruding portion 53 may be curved toward the wall surface 51s and be connected with the wall surface 51s without forming the discontinuous point.

The same applies to the end edge 53i. Furthermore, the end edge 51si of the wall surface 51s may be connected with the shroud 31s so as to form a discontinuous point (see FIG. 1). or may be curved toward the shroud 31s without forming a discontinuous point to be smoothly connected with the shroud 31s.

Operation and effect of this embodiment will be described.

The exhaust gas is taken in from the exhaust inlet port 21 into the turbine housing 13, passes through the turbine scroll 23, and flows from the inlet side of the turbine wheel 15 to the outlet side. With this operation, rotational force (rotational torque) is generated using pressure energy of the exhaust gas, and then turbine wheel 15, the rotor shaft 9, and the compressor wheel 35 rotate integrally. This makes it possible for air to be taken in from the air inlet port 41 into the compressor wheel 35 side, and is compressed at the time of passing through the diffuser 43. The compressed air passes through the compressor scroll 45, is discharged from the air discharge port 47, and is supplied to the engine. Through this series of processes, the air can be supercharged into the engine. Note that the exhaust gas flowing into the outlet side of the turbine wheel 15 is discharged from the exhaust discharge port 25 to the outside of the turbine housing 13.

The protruding portion 53 is protrudingly formed on the end edge 51si side of the wall surface 51s of the throttling part 51 on the inside in the radial direction. Thus, as can be understood from the newly obtained findings described above, it is possible to suppress the backflow of air on the low flow rate side in the operational range of the centrifugal compressor 27, whereby it is possible to suppress expansion of the backflow area generated on the upstream side of the compressor wheel 35.

The end edge 53o of the protruding portion 53 on the outside in the radial direction is located on the inside in the radial direction than the central position 51sm of the wall surface 51s of the throttling part 51 in the radial direction, and the average radius of curvature of the surface 53f of the protruding portion 53 in the meridian plane is set to be smaller than the average radius of curvature of the wall surface 51s of the throttling part 51 in the meridian plane. Thus, it is possible to effectively block part of the backflow on the shroud wall surface 43s side of the diffuser 43 with the portion (portion extending from the top portion to the end edge 53o on the outside in the radial direction) of the protruding portion 53 on the upstream side. This makes it possible to sufficiently suppress expansion of the backflow area generated on the upstream side of the compressor wheel 35 on the low flow rate side in the operational range of the centrifugal compressor 27.

The diffuser 43 is configured such that the flow passage area is minimal at the exit 51e of the throttling part 51 or before the exit 51e of the throttling part 51. In other words, the wall surface 51s of the throttling part 51 includes, in an area other than the area where the protruding portion 53 is disposed, a flow passage area minimum portion that makes minimal the flow passage area of the diffuser 43 together with the wall surface 51h of the throttling part 51, and the protruding portion 53 is located closer to the outlet side of the compressor wheel 35 than this flow passage area minimum portion. With this configuration, even if the protruding portion 53 is protrudingly formed on the wall surface 51s of the throttling part 51, the protruding portion 53 does not reduce the minimum flow passage area of the diffuser 43, whereby it is possible to secure sufficient choking flow rate of the centrifugal compressor 27.

As described above, according to the embodiment of the present disclosure, it is possible to sufficiently suppress expansion of the backflow area generated on the upstream side of the compressor wheel 35 on the low flow rate side in the operational range of the centrifugal compressor 27 while securing sufficient choking flow rate of the centrifugal compressor 27. Thus, it is possible to further extend the operational range of the centrifugal compressor 27 to the low flow rate side by suppressing surging of the centrifugal compressor 27 without deteriorating compressor performances on the high flow rate side in the operational range of the centrifugal compressor 27. In other words, it is possible to further extend the operational range of the turbocharger 1 for vehicles to the low flow rate side by suppressing surging of the turbocharger 1 for vehicles, without deteriorating compressor performances on the high flow rate side in the operational range of the turbocharger 1 for vehicles.

It should be noted that the present disclosure is not limited to that described in the embodiment. For example, the technical idea, which is applied to the centrifugal compressor 27 in the turbocharger 1 for vehicles, may be applied, for example, to a centrifugal compressor (not illustrated) in gas turbines and industrial pneumatic devices. Alternatively, the diffuser 43 may be provided with plural diffuser vanes (not illustrated) disposed at intervals in the circumferential direction, or the present disclosure can be carried out in other various modes. Furthermore, the scope of the right included in the present disclosure is not limited to the embodiment described above.

EXAMPLE

Figure 7:
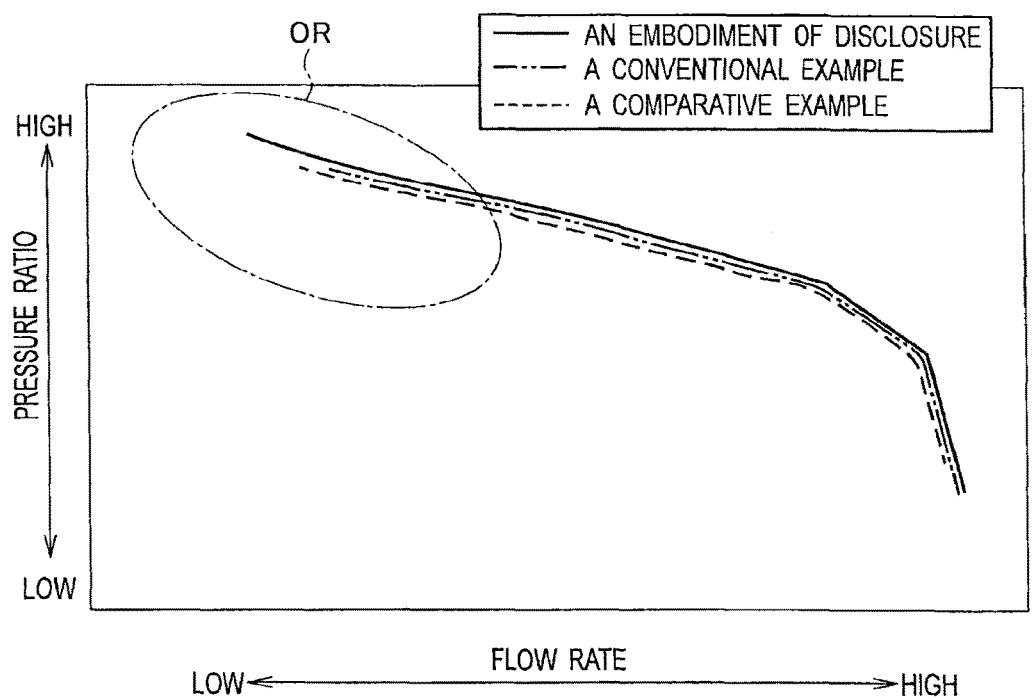
FIG. 7 is a diagram illustrating relationships between the flow rate and the pressure ratio in an embodiment of the present disclosure, in a conventional example, and in a comparative example.

An example according to the present disclosure will be described with reference to FIG. 7.

Computational fluid analysis was carried out to obtain relationships between the flow rate and the pressure ratio in the example of the present disclosure, in the conventional example, and in the comparative example, each of which has been described above. As a result, as illustrated in FIG. 7, it is found that, in the example of the present disclosure, it is possible to further extend the operational range OR of the centrifugal compressor to a lower flow rate side, as compared with the conventional example and in the comparative example.

What is claimed is:

1. A centrifugal compressor, comprising:
    a housing including a shroud inside thereof;
    a wheel rotatably provided in the housing;
    an inlet port for fluid communicating with an inlet side of the wheel;
    a diffuser communicating with an outlet side of the wheel;
    a discharge port for the fluid; and
    a scroll having a spiral shape, allowing the fluid flowing out from the wheel through the diffuser to circulate to the discharge port,
    wherein the diffuser includes:
        a first wall extending toward an outside in a radial direction; and
        a second wall having a tapered surface extending from the shroud toward the outside in the radial direction to gradually approach the first wall, and a parallel surface extending from the tapered surface toward the outside in the radial direction and extending in parallel to the first wall, and
    wherein the tapered surface of the second wall includes:
        a flow passage area minimum portion that makes minimal a flow passage area of the diffuser together with the first wall; and
        a protruding portion formed integrally with the tapered surface, located closer to the outlet side of the wheel than the flow passage area minimum portion, and including a curved surface protruding from the tapered surface toward a flow passage of the diffuser.

2. The centrifugal compressor according to claim 1, wherein
    the protruding portion comprises an end edge on the outside in the radial direction, and the end edge is located closer to the outlet side of the wheel than a central position of the tapered surface in the radial direction.

3. The centrifugal compressor according to claim 1, wherein
    in cross section including a center axis of the wheel, an average radius of curvature of the protruding portion is smaller than an average radius of curvature of the tapered surface of the second wall.

4. The centrifugal compressor according to claim 3, wherein
    the protruding portion comprises an end edge on the outside in the radial direction, and the end edge is located on closer to the outlet side of the wheel than a central position of the tapered surface in the radial direction.

5. A turbocharger that uses pressure energy of exhaust gas from an engine to supercharge air supplied to a side of the engine, the turbocharger comprising a centrifugal compressor according to claim 1.

* * * * *